UNITED STATES PATENT OFFICE.

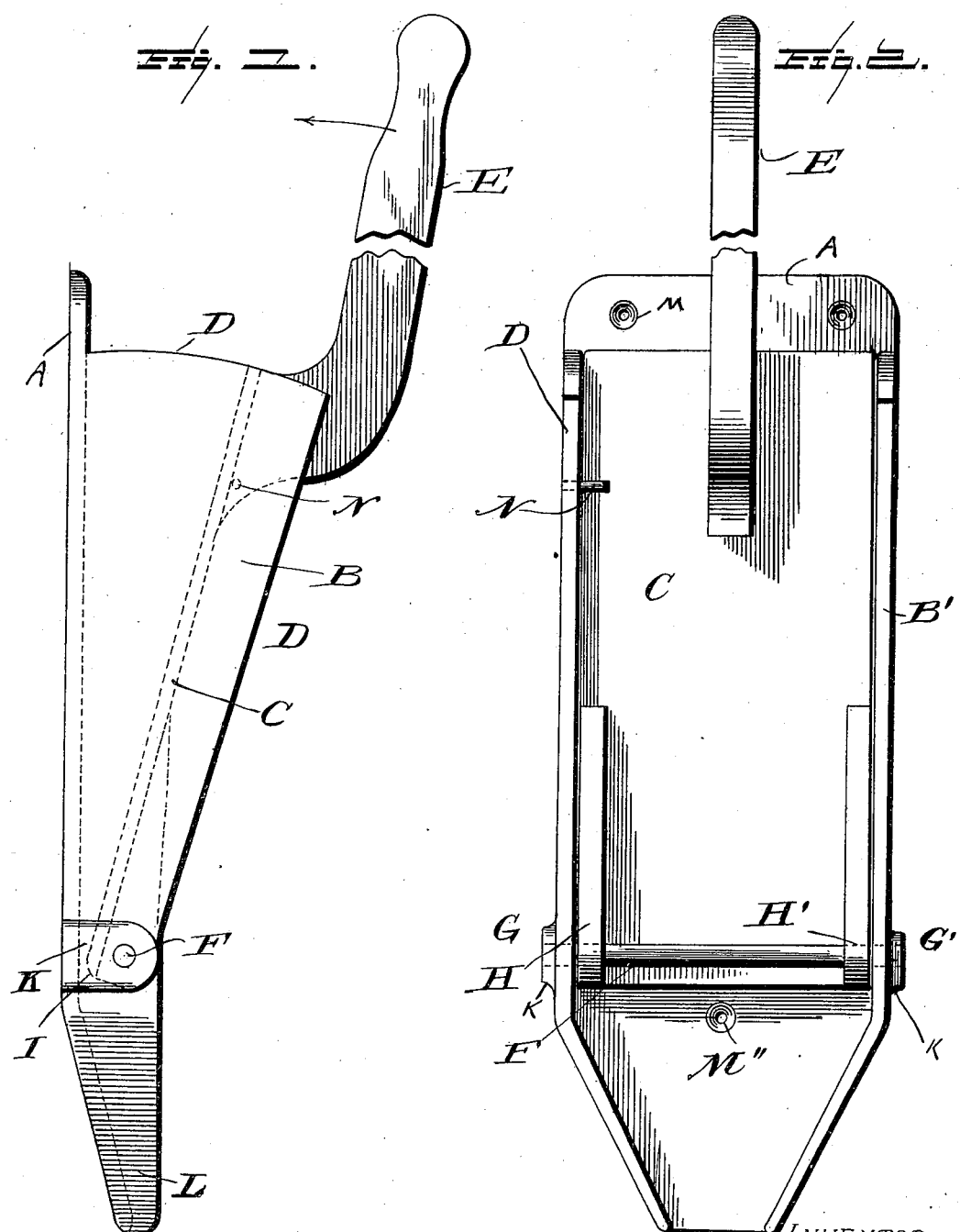

OGDEN BOLTON, JR., OF CANTON, OHIO.

BREAD OR CRACKER CRUSHER.

SPECIFICATION forming part of Letters Patent No. 651,455, dated June 12, 1900.

Application filed March 12, 1900. Serial No. 8,366. (No model.)

*To all whom it may concern:*

Be it known that I, OGDEN BOLTON, Jr., a citizen of the United States, residing at Canton, in the county of Stark and State of Ohio, have invented certain new and useful Improvements in Bread or Cracker Crushers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in bread and cracker crushers; and it consists in the provision of two plates, made, preferably, of metal, which are pivoted together in such a way as to form a receptacle into which the articles to be crushed are placed, one of said plates being provided with a handle for the purpose of forcing the pivoted plate toward the stationary one, suitable provision being made adjacent to the pivoted portions of the plates to allow the crushed particles to pass through into the spout-shaped end of one of the plates, from which the crushed particles may be guided into a receptacle.

My invention will be clearly understood when considered in connection with the following detailed description and the accompanying drawings, which form part of this application.

My invention is clearly illustrated in the accompanying drawings, which, with the letters of reference marked thereon, form part of this application, and in which drawings similar letters of reference indicate like parts throughout both views, in which—

Figure 1 is a side elevation of my improved device for crushing bread and crackers, and Fig. 2 is a front view.

Reference now being had to the details of the drawings by letter, A designates the stationary plate, which has right-angled wings or extensions D on its longitudinal edges, and the forward end L of said plate is upwardly-inclined, as shown, and the contracted sides of said plate converge, as shown clearly in the top plan view, this contracted portion of the stationary plate forming a suitable spout through which the crushed bread or crackers may be easily directed into a receptacle. On the outer faces of the wings D are the ears K, through which and the walls of said wings are formed apertures in which is journaled the pin or shaft F.

The pivoted plate C has reinforcing-ribs H integral therewith, and through said ribs apertures are formed, whereby said plate C is pivoted to the shaft F. The plate C is of such a width as to fit between the side wings D of the stationary plate A, and secured to the free swinging end of the plate C is a handle E, whereby the plate is operated. The under edge of the plate C, underneath its pivotal portion, is rounded, as at I, as shown clearly in the drawings, which provision is made for the purpose of having the space between the upper surface of the stationary plate and the end of the pivoted plate of the same width in whatever position the pivoted plate may be disposed, thus making an exit for the crushed bread or crumbs of unvarying width.

The outer edges of the wings D preferably taper from their upper ends toward the pivotal portions of the plates, and in order to limit the upward throw of the plate C, I provide a pin or pins N, which are carried by the wings D and have their free ends disposed in the path of the plate C, thus limiting the outward throw of said plate C as the edges of this plate come in contact with the pin or pins.

It is my purpose to secure the plate A to a wall or post by means of passing screws through the apertures M. By securing the plate A in substantially a vertical position to the wall or post particles of bread or crackers will fall by gravity after being crushed through the space between the plate A and the curved end of the pivoted plate C and through the spout, from which the crushed particles may be received into a suitable receptacle.

The device is operated, as will be readily understood, by forcing the handle toward the stationary plate, the articles to be crushed being first interposed into the wedge-shaped receptacle formed between the stationary plate, its side walls, and the plate C when the latter is at its outward throw. By working the handle back and forth the bread or crackers will be thoroughly crushed, and by reason of the space between the plate A and the curved portion E of the plate C being constant or of the same width in whatever position the handle may be disposed a ready exit is allowed for the crushed particles.

What I claim to be new, and desire to secure by Letters Patent, is—

1. A device for crushing crackers, &c., comprising a plate having right-angled wings along its longitudinal edges, a second plate pivoted between said wings, a handle mounted on said pivoted plate, a suitable space being left between the pivoted portions of the two plates, as an exit for the crushed particles, as set forth.

2. A device for crushing crackers, &c., comprising a stationary plate having side wings, one end of said plate converging to form a spout, a pivoted plate mounted between said wings, a handle on said pivoted plate, a suitable space intervening between the pivoted portions of the plates, as set forth.

In testimony whereof I affix my signature in presence of two witnesses.

OGDEN BOLTON, Jr.

Witnesses:
 URBAN A. WERNET,
 JOHN BARBER.